Patented Aug. 1, 1950

2,517,128

UNITED STATES PATENT OFFICE 2,517,128

UREA-FORMALDEHYDE-OXAZOLIDINE CO-REACTION RESIN

Vincent C. Meunier, Flourtown, and Claire M. Cox, Philadelphia, Pa., assignors to Rohm & Haas Company, Philadelphia, Pa., a corporation of Delaware No Drawing. Application May 3, 1949, Serial No. 91,224

3 Claims. (Cl. 260—67.5)

This invention relates to a new class of nitrogenous thermosetting resins and to the process by which they are prepared. The products of this invention are characterized by having a very high solubility in water, even when they are very highly condensed, and are, therefore, particularly valuable in operations requiring very dilute solutions of resins as, for example, in the treatment of fabrics and in the manufacture of paper products.

The resins of this invention are made by condensing formaldehyde with a mixture of urea and oxazolidine. Oxazolidine is a five-membered, heterocyclic compound of the formula

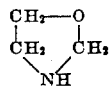

and, when it is heated together with urea and formaldehyde, it reacts, presumably at the iminohydrogen atom, and yields resins which are such more soluble than corresponding condensates of urea and formaldehyde alone.

While this invention is directed to modified urea-formaldehyde resins, it is to be understood that urea can be replaced in part with other carbamides such as thiourea, guanidine and monoacyl, monoalkyl, monoaryl, and monoaralkyl ureas.

In a similar manner some of the formaldehyde can be replaced by other aldehydes such as acetaldehyde, benzaldehyde, butyraldehyde and furfuraldehyde. While it is preferred to employ the formaldehyde in the form of an aqueous solution, it can also be used in its polymeric forms, e. g. as paraformaldehyde. The amount of formaldehyde which is employed is most conveniently based upon the amount of urea present and the preferred ratio for purposes of this invention is 2 to 3 moles of formaldehyde per mole of urea, although lower and higher ratios are capable of reacting.

The amount of oxazolidine which is used is most important. From 0.02 to 0.5 mole per mole of urea is the required amount. When less than 0.02 mole of oxazolidine is present, its effect is negligible and the resin does not acquire enhanced water solubility. A ratio of more than a half-mole results in an incompletely reacted product or one which does not thermoset rapidly and completely to an insoluble and infusible product. For most purposes, a resin containing from 0.1 to 0.2 mole of oxazolidine has the optimum combination of properties and this range therefore is much preferred.

In the preparation of the resinous condensates of this invention the oxazolidine, formaldehyde and urea are mixed and heated together. While this is the recommended procedure it may be varied within reason without departing from the spirit of this invention, the purpose of which is to prepare a water-soluble condensate of urea, formaldehyde and oxazolidine. Thus, for example, urea and formaldehyde can be partially condensed and then reacted with the oxazolidine. Alternatively the oxazolidine and the urea or the formaldehyde can be mixed and thereafter reacted with the third component of the resin. During the preparation of the resin, all three components combine chemically. Care must be exercised so that the oxazolidine reacts and that the urea and formaldehyde also condense to form a polymerized product.

It is important to regulate the temperature and the pH of the reaction mixture so that polymerization by condensation of the urea and formaldehyde, which is favored by high temperature and low pH, does not proceed too rapidly with the exclusion of the reaction of the oxazolidine.

These modified resins can be prepared at a pH of 1.5 to 10, although a pH range of 4 to 7 is much preferred. At pH's below 4 there is a marked tendency of the resin to polymerize to the gelled condition and the finished product must be quickly neutralized in order to prevent subsequent gelation. At pH's above 7 the condensation polymerization proceeds much more slowly, in fact unnecessarily slowly. Within the pH range of 4 to 7 the rate of polymerization is fast enough for commercial purposes and at the same time is readily controlled.

Usually, at a given pH, the rate of condensation can be controlled by regulating the temperature. Preferably, temperatures above 40° C. are employed, although condensation will take place at temperatures below 40° C. The upper limit is ordinarily the boiling point of the reaction mixture. This boiling point will depend upon the external pressure, the presence of dissolved salts, and similar factors. For the most part, it is convenient to operate at atmospheric pressure and at a temperature approximating 105° C., the point at which water is distilled from the reaction mixtures at normal atmospheric pressure.

The reaction may be carried to any desired end point, depending upon the intended use of the product. As the reaction continues, the viscosity of the reaction mixture increases. For this reason, viscosity is a valuable index of the extent of reaction, and the resin is ordinarily condensed until a 50% solution of it in water has a viscosity above 0.5 poise at 25° C. A viscosity of 1 to 4 poises is preferred, particularly when the resin is to be used for impregnating purposes.

The urea-formaldehyde-oxazolidine resins are thermosetting and are readily converted to the insoluble, infusible form by the action of heat and/or acidic catalysts which are commonly employed for the conversion of unmodified urea-formaldehyde resins. The product may be used as a solution, or it may be concentrated or dried. Drying may be accomplished by conventional methods such as heating, with or without vacuum, drum-drying, or spray-drying. Since the product is thermosetting, care must be exercised, when a soluble product is desired, to conduct the drying so as to avoid converting the material to an infusible and insoluble condition. A properly dried resin is extremly stable and can be stored at room temperature for a period of months without loss in solubility.

The following examples serve to illustrate how the products of this invention can be prepared:

*Example 1*

Into a 3-necked flask, equipped with thermometer, condenser, water-separator and mechanical stirrer was charged 1021 grams of a 37% aqueous solution of formaldehyde (12.6 moles HCHO), 91.2 grams (1.2 moles) of oxazolidine, and 360 grams (6 moles) of urea. The pH was adjusted to 7.3 by the addition of 5 c. c. of a 10% aqueous solution of sodium carbonate and the mixture was heated. As the temperature reached 80° C. it was noted that an exothermic reaction took place and external heating was temporarily suspended until the exotherm was dissipated. The mixture was heated to boiling and 95 c. c. of water was removed by distillation. The pH of the mixture was then lowered to 5.0 by the addition of a 37% solution of hydrochloric acid. Refluxing was continued for 5 hours. The reaction mixture was then cooled to room temperature and its pH was raised to 7.4 with sodium carbonate. The filtered product had a viscosity of 2.3 poises at 25° C. and a solids content of 51.2%. It was capable of dilution with several times its volume of water at room temperature.

This resin and the others within the scope of this invention are particularly valuable for use in the manufacture of paper. Because they are so soluble in water, even when highly condensed, they can be added to paper pulp in the beater without danger of precipitation. Furthermore, because of the oxazolidine groups in their structure and their high molecular weight they are substantive to paper fibers even in the presence of great volumes of water. When the paper which contains these resins is heated and/or aged it acquires a high degree of wet-strength. It is known that urea resins in general have been used for this purpose; but the specific products of this invention have an advantage over such older resins, which has been demonstrated commercially. This advantage resides in the ability of the resins to produce paper of high wet-strength from pulp which contains hydrochloric acid rather than alum which has been required heretofore. As a result a product of high wet-strength and higher porosity is obtained.

We claim:

1. As a new composition of matter, a water-soluble, thermosetting resinous product having a viscosity of at least 0.5 poise when measured as a 50% aqueous solution at 25° C. and obtained by reacting in aqueous solution at a temperature from 40° C. to the boiling point of said solution and at a pH from 1. to 10 as the essential reactants urea, formaldehyde and oxazolidine in the ratio of two to three moles of formaldehyde and 0.02 to 0.5 mole of oxazolidine per mole of urea.

2. As a new composition of matter, a water-soluble, thermosetting resinous product having a viscosity of at least 0.5 poise when measured as a 50% aqueous solution at 25° C. and obtained by reacting in aqueous solution at a temperature from 40° C. to the boiling point of said solution and at a pH of 4 to 7 as the essential reactants urea, formaldehyde and oxazolidine in the ratio of two to three moles of formaldehyde and 0.02 to 0.5 mole of oxazolidine per mole of urea.

3. As a new composition of matter, a water-soluble, thermosetting resinous product having a viscosity of at least 0.5 poise when measured as a 50% aqueous solution at 25° C. and obtained by reacting at a temperature of 40° C. to 105° C. and at a pH of 4 to 7 as the essential reactants urea, formaldehyde and oxazolidine in the ratio of two to three moles of formaldehyde and 0.1 to 0.2 mole of oxazolidine per mole of urea.

VINCENT C. MEUNIER.
CLAIRE M. COX.

No references cited.

Certificate of Correction

Patent No. 2,517,128 August 1, 1950

VINCENT C. MEUNIER ET AL.

It is hereby certified that error appears in the printed specification of the above numbered patent requiring correction as follows:

Column 4, line 27, for "1. to 10" read *1.5 to 10*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*